W. J. RICHARDS.
LUBRICANT GLAND.
APPLICATION FILED SEPT. 28, 1907.
1,001,687.
Patented Aug. 29, 1911.
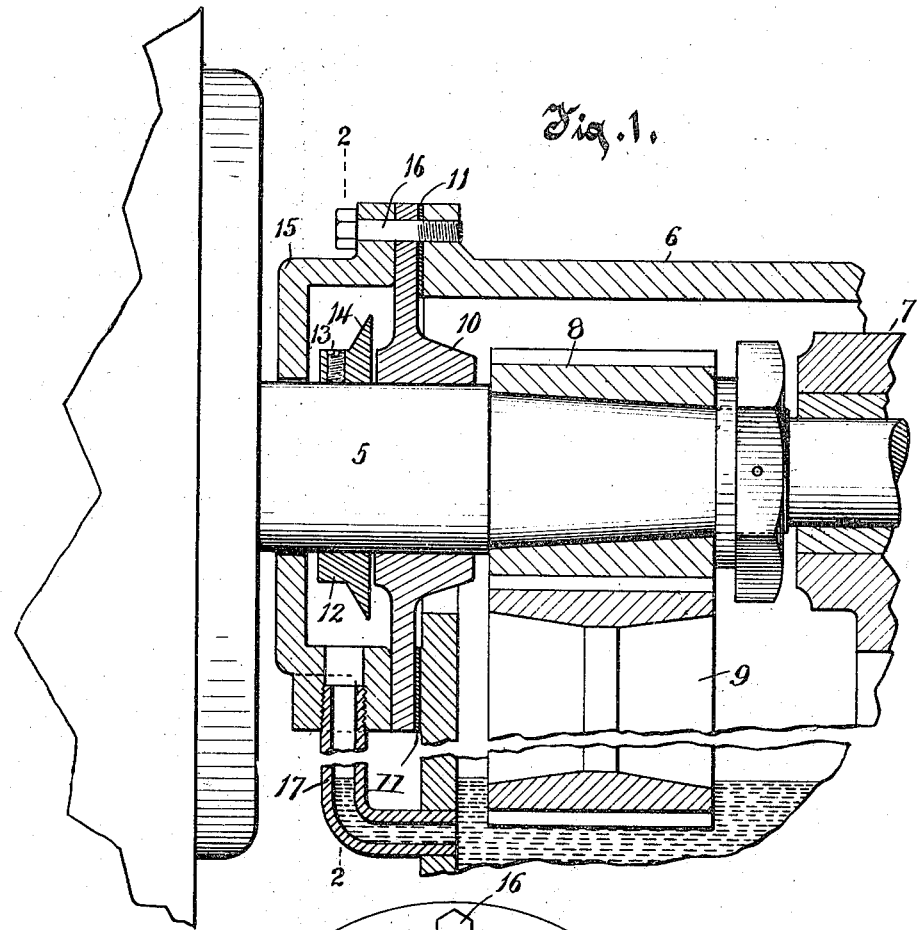
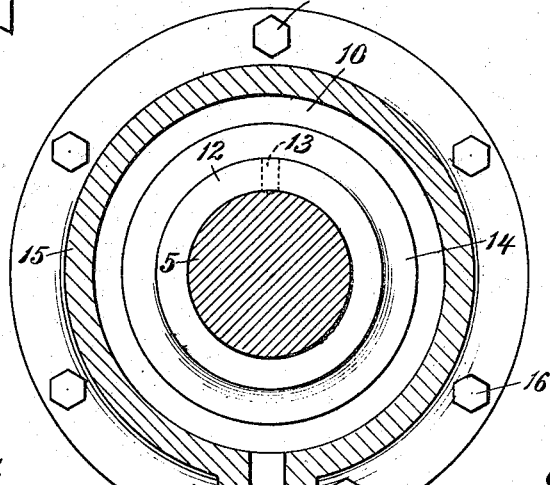

UNITED STATES PATENT OFFICE.

WALTER J. RICHARDS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

LUBRICANT-GLAND.

1,001,687.     Specification of Letters Patent.     Patented Aug. 29, 1911.

Application filed September 28, 1907. Serial No. 394,961.

*To all whom it may concern:*

Be it known that I, WALTER J. RICHARDS, residing in Milwaukee, in the county of Milwaukee and State of Wisconsin, have invented new and useful Improvements in Lubricant-Glands, of which the following is a description, reference being had to the accompanying drawings, which are a part of this specification.

This invention has for its object to provide means for preventing the leakage of lubricant at the point of entrance of a motor shaft to a compressor casing or wherever similar conditions are to be met with.

In many motor compressors the compressor is contained within a casing and is geared with a motor on the outside of the casing, the motor shaft passing through an opening of the casing for that purpose, and as there is a slight pressure within the compressor casing the lubricant which is carried up to the motor shaft by the said gearing will be ejected in great quantities through the opening for the motor shaft if no provision is made to prevent its doing so.

The present invention is designed for the particular purpose of preventing the waste of lubricant in this manner, but is applicable to other uses where somewhat similar conditions are to be met with.

With the above and other objects in view the invention consists in the lubricant gland herein claimed, its parts and combinations of parts and all equivalents.

Referring to the accompanying drawings in which like characters of reference indicate the same parts in the different views; Figure 1 is a sectional elevation of a lubricant gland constructed in accordance with this invention and applied to a motor compressor; and, Fig. 2 is a transverse sectional view thereof on the plane of line 2—2 of Fig. 1.

In these drawings 5 represents the armature shaft of an electric motor which passes through an opening of a compressor casing 6 and is journaled in a bearing 7 therein. The motor shaft carries a pinion 8 meshing with a gear wheel 9 for driving the compressor which is not shown. The gear wheel 9 usually runs in oil and carries great quantities of it up to the pinion 8.

To prevent the lubricant passing out through the opening of the compressor casing around the motor shaft, said motor shaft has a flanged ring 10 mounted thereon with a tight working fit, its outwardly extending flange forming a seal for the opening of the casing by fitting against the walls of the casing with a packing ring 11 therebetween. The bearing of the ring 10 upon the motor shaft is of sufficient length to effectively check the outflow of lubricant, though a slight amount may find its way through.

To protect the lubricant which may work through the ring 10, a ring 12 is fixed on the motor shaft close to the ring 10, being preferably held to the shaft by a set screw 13, and its tapering flange 14 close to the ring 10 serves as an oil thrower to throw the lubricant by centrifugal force away from the shaft and into a guard 15 which forms a housing therefor. The guard 15 is entirely free from the motor shaft and is held in place by bolts 16 passing through its surrounding flange and through the flange of the ring 10 and threading into the compressor casing 6. A return pipe 17 leads from the bottom of the guard 15 to the lower part of the compressor casing 6 beneath the oil level thereof so that the oil thrown off by the ring 12 is returned to the compressor casing.

By means of this construction the tight working fit of the ring 10 on the motor shaft prevents most of the leakage of lubricant between them and the packing between the flange of said ring and the compressor casing enables a tight fit between these parts without liability of binding the ring on the motor shaft, such oil as finds its way through the ring 10 being thrown off by the ring 12 into the guard 15 from which it is returned by the pipe 17 to the compressor casing.

What I claim as my invention is:

1. A lubricant gland, to avoid the waste of lubricant under pressure, comprising a casing subject to an internal pressure, a shaft entering the casing, a flanged ring having a tight working fit on the shaft, a packing ring between the flange and the walls of the casing to form a pressure tight connection therewith without binding the ring on the shaft, a second ring fixed on the shaft outside of the flanged ring, a flange on the second ring for throwing lubricant therefrom which finds its way between the shaft and the first mentioned ring, a guard surrounding the second ring to receive the lubricant thrown off therefrom, means for securing the guard and the first mentioned flanged ring to the casing, and a pipe connecting the guard with the casing to return the lubricant to the casing.

2. A lubricant gland to avoid the escape of lubricant under pressure, comprising a casing subject to an internal pressure and having an opening, a shaft entering the casing through the opening entirely free from the walls of the opening, a ring having a tight working fit on the shaft and a surrounding flange to overlap the edges of the casing around the opening, a yielding packing ring interposed between the flange of the ring and the walls of the casing around the opening, means for securing the ring flange to the casing, said packing ring serving to permit the casing being sealed by means of the flanged ring without the liability of the ring binding on the shaft, said ring by its tight working fit on the shaft serving to largely prevent the escape of lubricant between the ring and the shaft, a housing surrounding the shaft and secured to the flanged ring to form a chamber outside of the flanged ring, an oil-throwing ring fixed on the shaft for throwing against the walls of the chamber such lubricant as may pass the flanged ring, and a pipe leading from the bottom of the chamber to the casing to return the lubricant to the casing.

In testimony whereof, I affix my signature, in presence of two witnesses.

WALTER J. RICHARDS.

Witnesses:
R. S. C. CALDWELL,
ANNA F. SCHMIDTBAUER.